(12) United States Patent
Klein

(10) Patent No.: US 7,097,152 B2
(45) Date of Patent: Aug. 29, 2006

(54) AUTOMATIC SUPPORT LOCKING DEVICE FOR PORTABLE TOWERS AND TANKS

(76) Inventor: Richard F. Klein, 816 S. Cucamonga Ave., Ontario, CA (US) 91767

( * ) Notice: Subject to any disclaimer, the term of this patent is extended or adjusted under 35 U.S.C. 154(b) by 120 days.

(21) Appl. No.: 10/924,573

(22) Filed: Aug. 24, 2004

(65) Prior Publication Data

US 2006/0043351 A1 Mar. 2, 2006

(51) Int. Cl.
*B66F 7/12* (2006.01)
(52) U.S. Cl. .................................................. 254/89 H
(58) Field of Classification Search ............. 254/89 H, 254/423; 269/69, 10
See application file for complete search history.

(56) References Cited

U.S. PATENT DOCUMENTS 3,736,756 A * 6/1973 Lloyd ........................ 405/204

| 4,411,408 | A | 10/1983 | Radovan et al. |
| 5,181,693 | A | 1/1993 | Lorenz |
| 5,322,265 | A | 6/1994 | Keuck |
| 5,486,069 | A | 1/1996 | Breeden |
| 5,918,860 | A | 7/1999 | Cho |
| 6,135,419 | A | 10/2000 | Hutson, Jr. et al. |
| 6,257,272 | B1 | 7/2001 | Keiser |
| 6,705,595 | B1 * | 3/2004 | Belley et al. .............. 254/89 H |

* cited by examiner

*Primary Examiner*—Robert C. Watson
(74) *Attorney, Agent, or Firm*—Lewis M. Brande; Thomas A. McCleary; Brande and McCleary

(57) ABSTRACT

The current invention describes an automatically locking leg support system for portable water and fuel towers. The system automatically locks a wedge into a support leg to support a water tower, once the tower reaches the desired elevated position, and holds the support leg in the desired position. When the tank is to be lowered, the tower is emptied and a hydraulic system disengages the automatic locking device so that the tower can be lowered.

10 Claims, 6 Drawing Sheets

AUTOMATIC SUPPORT LOCKING DEVICE FOR PORTABLE TOWERS AND TANKS

FIELD OF THE INVENTION

The present invention relates to the field of hydraulic, pneumatic or electric locking devices to be used in portable water towers and tanks that are used at construction and similar sites, and uses a feature that will automatically lock the tank in an elevated position.

BACKGROUND OF THE INVENTION

The automatic support locking device for portable towers and tanks, hereafter referred to as "Auto-Lock"™ is a device that is used with a Porto-Tower® or any other extensible tube or leg device that is used to support a platform or a tank that has either cylindrical or square legs. The Porto-Tower® is lifted from the vehicle chassis, located at ground level, to an elevated position in order to provide a gravity feed for the liquid stored inside the tank. The auto-lock automatically penetrates into the tubes or legs of the portable tower securing the raised tank to a predetermined height and locks the elevated tank preventing inadvertent raising or lowering of the tower from the selected position due to operator error or mechanical failure.

The auto-lock is a locking device that engages into a desired position by using a spring and wedge combination device as the leg is raised or lowered through an opening within the leg or tube. The platform or tank will then be prevented from being raised or lowered, provided the auto lock wedge is in place.

The auto lock wedge can only be released by using either hydraulic pressure, pneumatic pressure or electric solenoid operation. The hydraulic or pneumatic pressure is injected into the cylinder which compresses the auto lock spring. This then removes the wedge or pin from the tube or leg, allowing the platform or tank to be either raised or lowered into an alternate position.

DESCRIPTION

An auto lock device can be used on any platform or tank raising device such as the Klein Porto-Tower® which raises a platform or tank by means of hydraulic or air cylinders with an independent hydraulic or air system.

The auto lock device is comprised of a cylinder with a piston, a shaft and a spring behind the piston which forces the device to it's open position. The piston shaft is connected to a wedge type or round metal plate which is aligned by track means to slide within a straight line. The wedge, when extended by the piston, is inserted through a slot in a tube or leg tank support to force a blockage so that the inner tube or leg tank support will not move, thus locking the inner leg tank support in position. To unlock the inner leg tank support and allow the tank supports freedom to move, the piston is supplied with air or hydraulic oil pressure that removes the wedge by compressing the spring that pushes the piston and wedge into it's locking position.

DESCRIPTION OF THE PRIOR ART

U.S. Pat. No. 3,880,256 reveals scaffolding with an improved elevator system. The elevator assembly is attached to a standard scaffold section and can be added to scaffolding as the work continues upward. The system uses a work platform that incorporates a vertical track with a gripper and lift means to elevate the work platform. The current invention deals with elevating and locking into position portable water and fuel tanks and this is not taught by U.S. Pat. No. 3,880,256.

U.S. Pat. No. 4,411,408 shows a jack-up platform apparatus. This invention relates to offshore platforms or towers, such as radar stations, light beacons, scientific laboratories, oil derricks, etc. The jack-up apparatus has a rectangular reaction member designed to be connected at one end to a platform deck. An abutment member is connected to the other end of the reaction member and a first and second leg are mounted between the abutment member and the platform deck. A jack assembly is mounted between the first and second leg for translating the members along the reaction member where activation of the first and second leg and jack assembly raise the platform leg. This patent doesn't teach locking the jacked-up platform into it's elevated position as the current invention does. Nor does it use a hydraulic system to elevate the platform or to lower the platform in conjunction with a support locking device.

U.S. Pat. No. 5,181,693 reveals an extensible tower with hydraulic cylinders in series. This tower has an extensible stabilizing tower built in several stages. Each hydraulic lifting means is comprised of a plurality of cylinders and the overlapping rigid vertical members may have different cross sections. The hydraulic means consist of a pair of such cylinders for lifting a square or rectangular stabilizing tower. The bases of the cylinders are connected to a platform. However, this patent makes no mention of a support locking device as in the current invention.

U.S. Pat. No. 5,322,265 describes a tower lifting apparatus. This patent reveals a system that lifts each leg of a tower using clamps and a hydraulic jack control system. The clamps are connected by cross braces and include structure to engage a tower leg. Again, no support locking device is incorporated in this design.

U.S. Pat. No. 5,486,069 defines an offshore jack-up rig locking system. This invention for fixation of jack-up rig legs and hull are suitable for completely automatic, computer controlled operation from a control room. The jack towers may be fixed to the hull or to a frame, which is fixed to the hull. The apparatus itself consists of a plurality of pinion gears engaging a toothed rack for each leg of the jack tower. A set of extensible rams slide against upper and lower wedge shaped supports which engage the toothed members of the toothed rack, permitting removal of a chock. When the tower reaches the desired elevation, a chock engages with the teeth on each leg and a sequencing controller in the jacking control room identifies that the chock is installed. When both the upper and lower wedges on both legs are in contact, the actuator is energized to a higher load level to ensure that the chock is firmly seated. The current invention does not use a pinion gear system or a chock to engage toothed members of a toothed rack. Also, the current invention is not used for offshore rigs, but for portable water towers.

U.S. Pat. No. 5,918,860 shows an uplift assembly for continuously uplifting mold plates. The uplift assembly has a first and second uplifter, a first and second positioning plate attached to the first and second uplifters respectively, a first, second, third and fourth clamping plate and a base plate beneath the third clamping plate, the fourth clamping plate and the second uplifter. The current invention is used for elevating and holding portable water towers in position.

U.S. Pat. No. 6,135,419 reveals a column repair jack for repairing a column. The column repair jack has a base, a lift member, an extending member, a releasable engaging member, a lift actuating member and a positioning member. After attachment to a column, the lift actuating member transfers at least a portion of the load from the column to the column repair jack, which facilitates the repair of the column. The current invention is not used to elevate columns for repair, but to elevate portable water towers and to lock them into the elevated postion.

U.S. Pat. No. 6,257,272 describes a portable erect able tower that has a tank, a base frame and forward and rear pairs of legs, the pairs of legs positioned on opposite sides of the tank and a brace with two sections hinged for one way articulation to prevent downward movement of the tank. This invention differs from the current invention in that it "swings" upward into position on a large hinge, whereas the current invention is hydraulically elevated into position and held into place by the autolocking device.

SUMMARY OF THE INVENTION

The following description is provided to enable a person skilled in the art to make and use the invention and sets forth the best modes contemplated by the inventor for carrying out his invention. Various modifications, however, will be readily apparent to those skilled in the art, since the generic principles of the present invention have been defined herein specifically to provide for an automatic support locking device for portable towers and tanks.

The purpose of the current invention is to provide construction sites with an improved method of securing elevating tank systems. Currently, the tanks are elevated and maintained in an elevated position by Hydraulic or Pneumatic pressure while the operator manually engages a locking feature on the support legs. The operator will then lower the tank or platform assembly until it "locks" into the existing slots. Hydraulic pressure is then released. In order to lower the tank or platform assembly, the operator provides Hydraulic or Pneumatic pressure to raise the tank or platform assembly, and while under pressure, the locks are secured into their respective "travel" position, to allow the tank or platform assembly to be lowered to a travel or locked position. Normally, two individuals are needed to raise or lower the tank or platform assembly in order to provide maximum safety. The Auto-Lock™ eliminates the requirement of two operators for safe extension and lowering of the tank or platform assembly.

The automatic support locking device for towers and tanks "Auto-Lock"™ is utilized with a Porto-Tower® or any other extensible tube or leg device that is used to support a platform or a tank that has either cylindrical or square legs. The Porto-Tower® is lifted from the vehicle chassis by hydraulic, pneumatic or electric means from ground level to an elevated position, in order to provide a gravity feed for the liquid stored inside the tank.

The tank's Auto-Locks™ automatically penetrate into the tubes or legs of the portable tower through holes or slots in the legs to secure the raised tank to a predetermined height. The Auto-Lock™ locks the elevated tank in position, thus preventing inadvertent raising or lowering of the tower from the selected position due to operator error or mechanical failure.

The Auto-Lock™ is a locking device that engages into a desired position by using a spring and wedge in combination with each other as the leg is raised or lowered, through an opening in the leg or tube. The platform or tank will then be prevented from being raised or lowered, provided the Auto-Lock™ wedge is in place.

The Auto-Lock™ wedge can only be released by using hydraulic pressure or pneumatic pressure or by means of an electric solenoid operation. Hydraulic or pneumatic pressure is injected into the cylinder, which compresses the auto lock spring. This then retracts the wedge or pin from the tube or leg, allowing the platform or tank to be either raised or lowered into an alternate position.

In the preferred embodiment, a dual cylinder hydraulic system is shown in conjunction with the Porto-Tower®. At the front and rear end of the tank, a hydraulic cylinder is mounted at the middle front and middle rear of a frame assembly. Generally the wedge or pin will be allowed to bear against the internal leg of the tube so that the Hydraulic, or Pneumatic pressure is not used. As the Porto-Tower® is raised to its desired position, the spring causes the wedge or pin to automatically be extended into the corresponding slot or hole to secure the tank or platform assembly in the desired position on its multiplicity of support legs. This acts as a safety feature of the invention in that there is no additional operator input required in order for the tank to be "locked" or secured in its "safe" position.

As an additional safety feature of the invention, the solenoid (either Hydraulic, Pneumatic, or Electric) may have a band of green and red paint. When the red paint is showing, the Auto-Lock® is not engaged, and therefore not safe. When only green paint shows, the wedges, or pins have extended into their respective slots, and the Porto-Tower® is now in a safe, or "Locked" position.

When the tank or platform assembly needs to be lowered, the tank is emptied and hydraulic pressure is added to each of the tank or platform assembly cylinders to take the weight off of the Auto-Lock™ devices. Then, hydraulic pressure is added to each Auto-Lock™ device in a reverse direction to compress the spring and to drive the wedge out of the hole in the leg. This frees the legs and allows the main tank or platform assembly cylinders to lower the tank or platform assembly to the frame assembly for transport.

BRIEF DESCRIPTION OF THE DRAWINGS

The objects and features of the present invention, which are believed to be novel, are set forth with particularity in the claims. The present invention, both as to its organization and manner of operation, together with further objects and advantages, may be best understood by reference to the following description, taken in connection with the accompanying drawings, in which:

DETAILED DESCRIPTION

Figure 1:
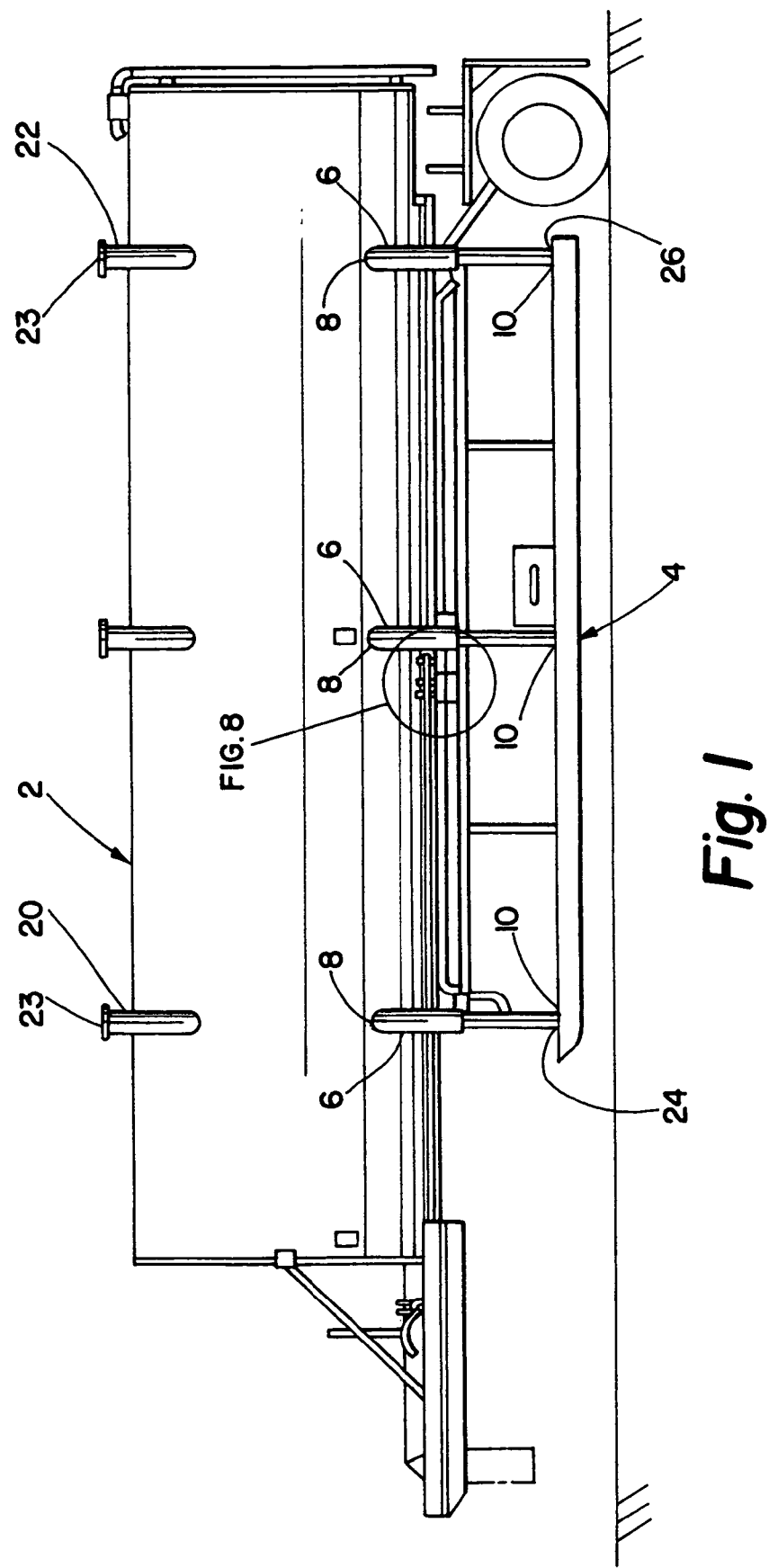
FIG. 1 shows a tank or platform assembly in a travel or retracted position
Figure 2:
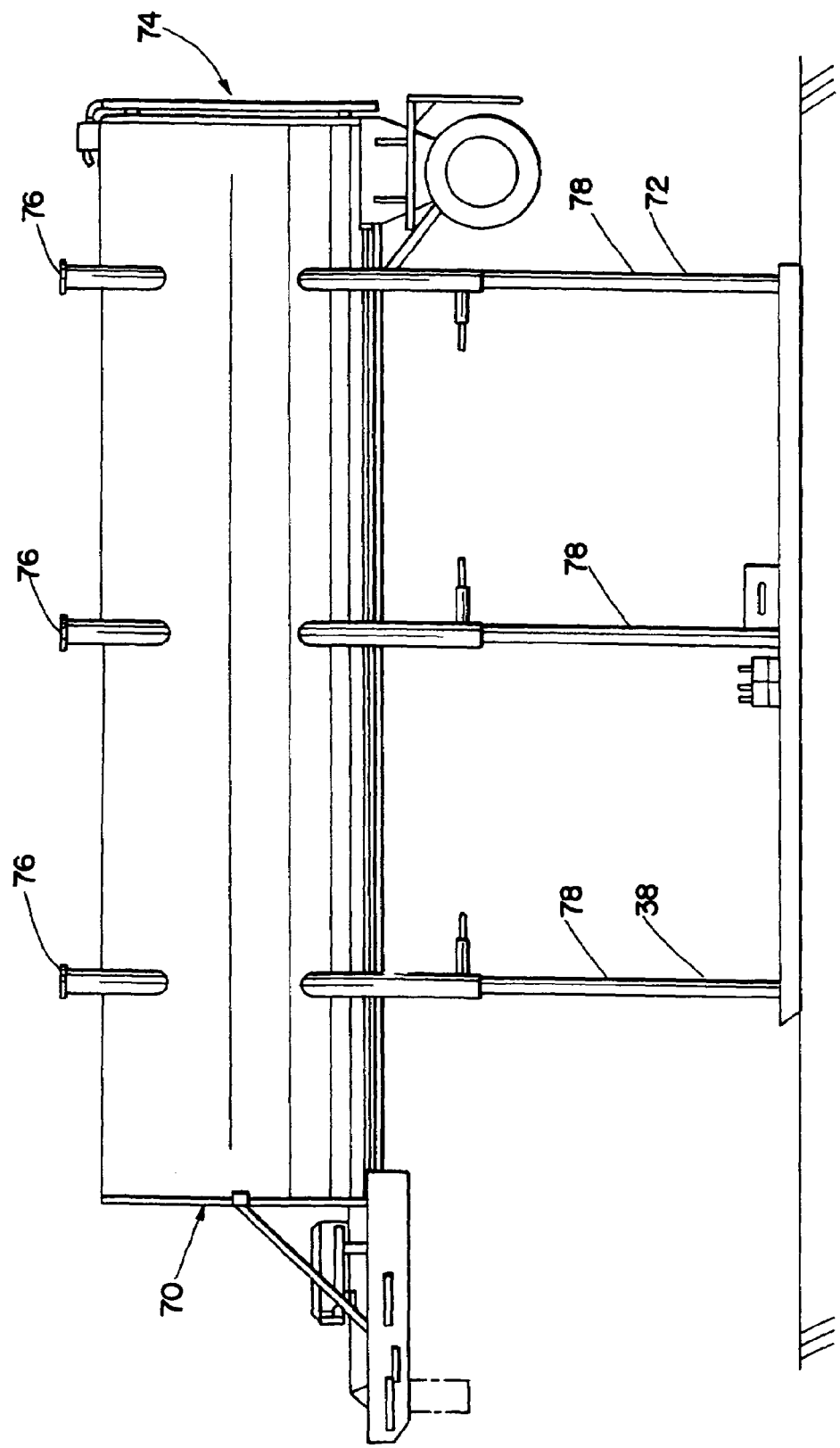
FIG. 2 shows a tank or platform assembly in an extended position
Figure 3:
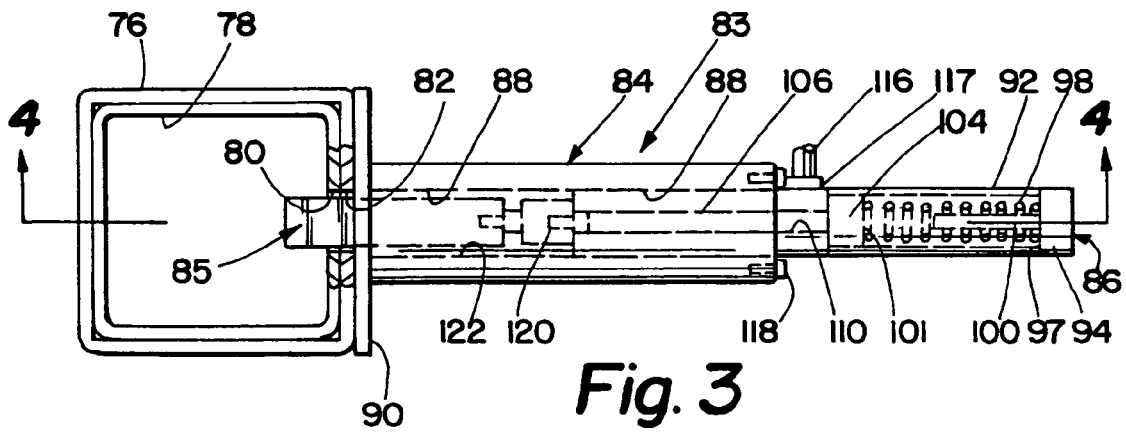
FIG. 3 shows a cross section of a support leg of a tank or platform assembly with an Auto-Lock™ device
Figure 4:
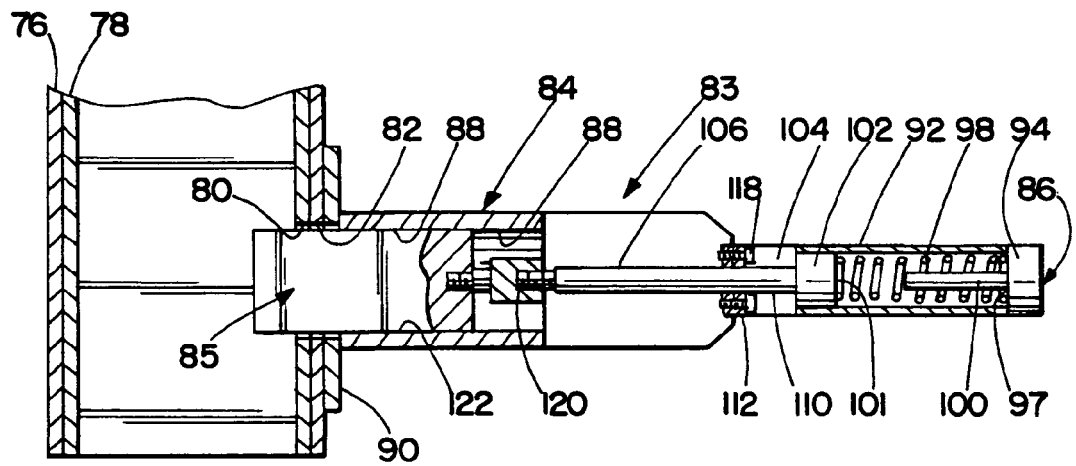
FIG. 4 shows a cross section of a support leg of a tank or platform assembly with an Auto-Lock™ device side view in a lock position
Figure 5:
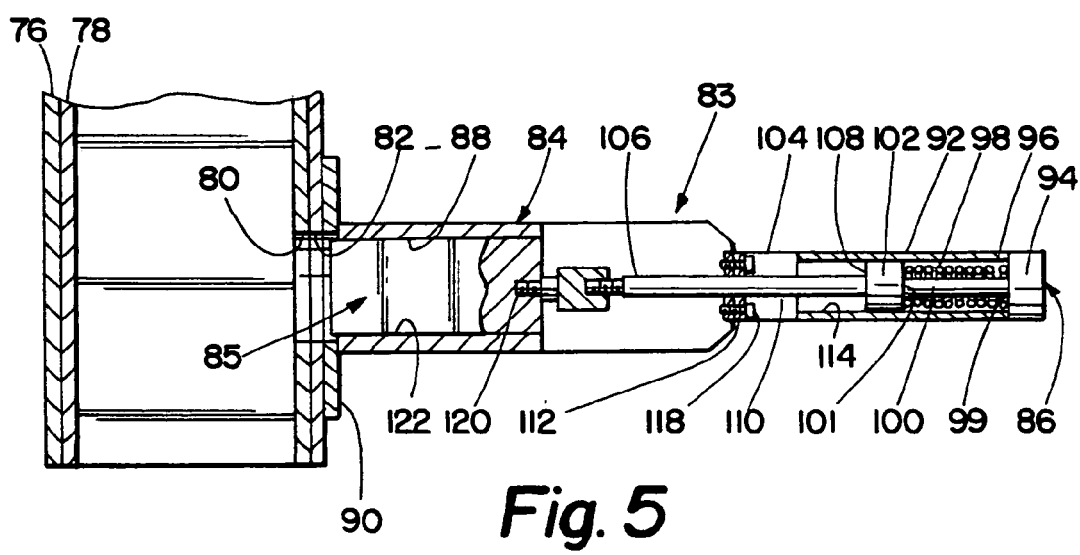
FIG. 5 shows a cross section of a support leg of a tank or platform assembly with an Auto-Lock™ device side view in an unlocked or compressed position
Figure 6:
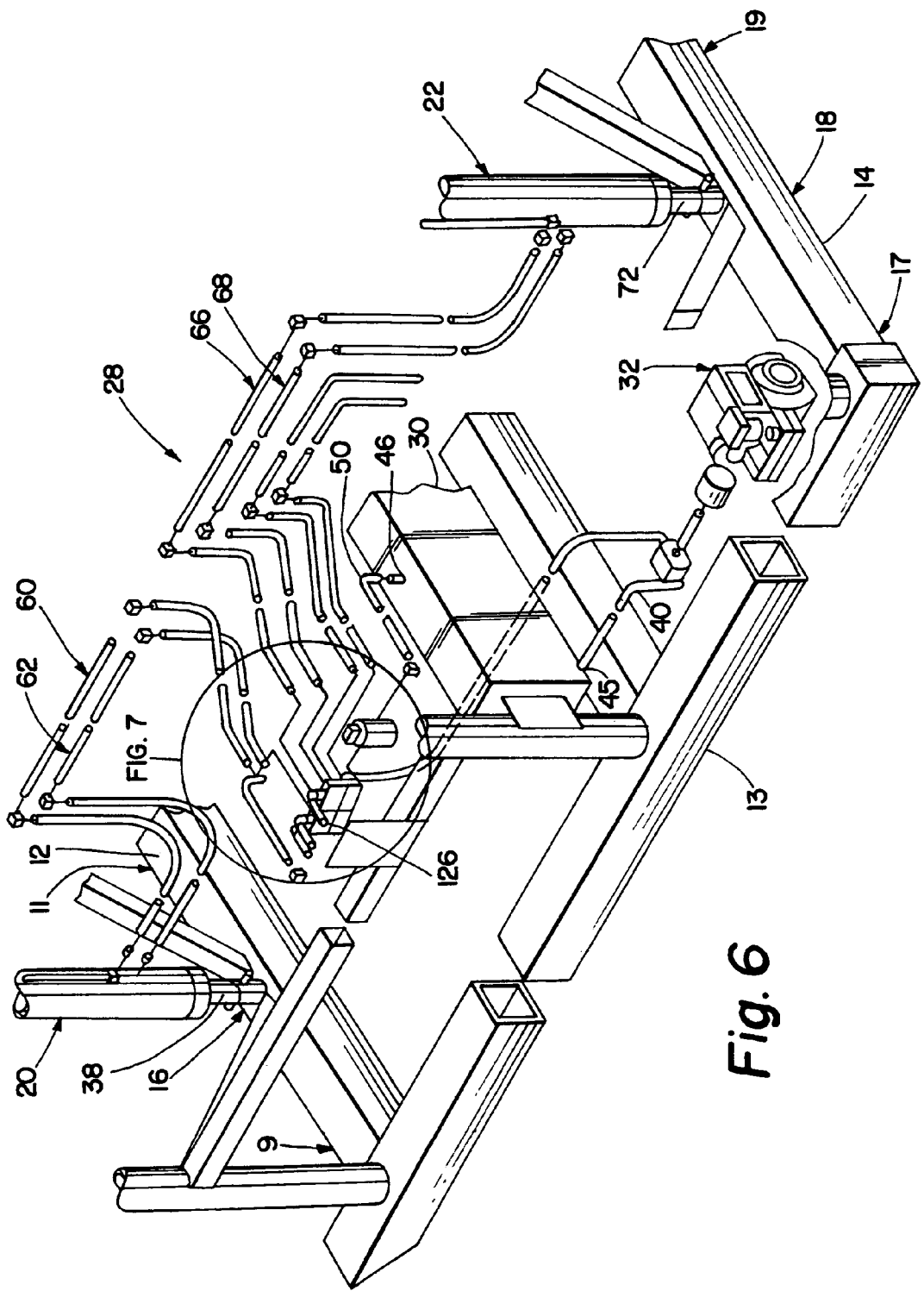
FIG. 6 shows a schematic of the hydraulic system for the Port-o-Tower® with the Auto-Lock™ device control added
Figure 7:
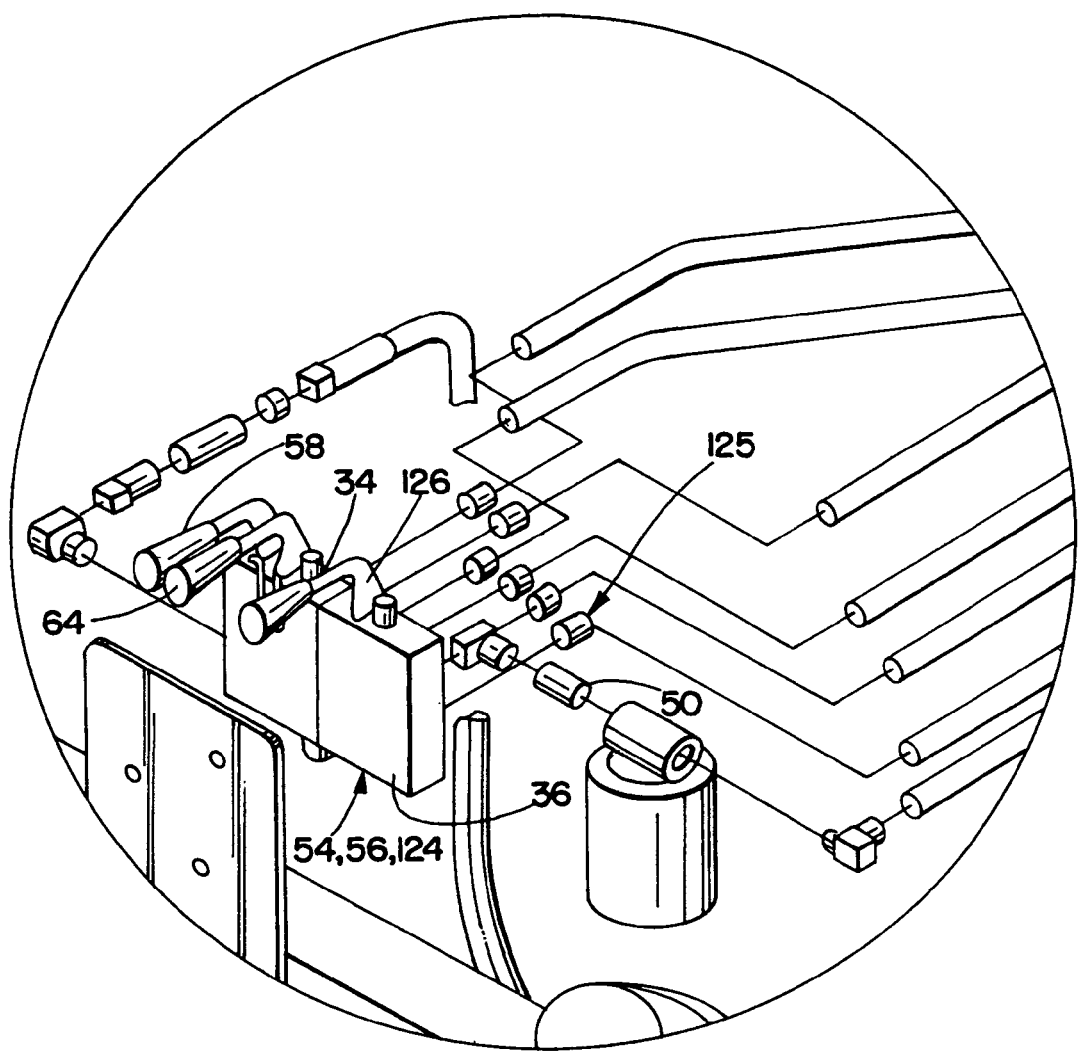
FIG. 7 shows a detail view of the controls for the Port-o-Tower® and the Auto-Lock™ device
Figure 8:
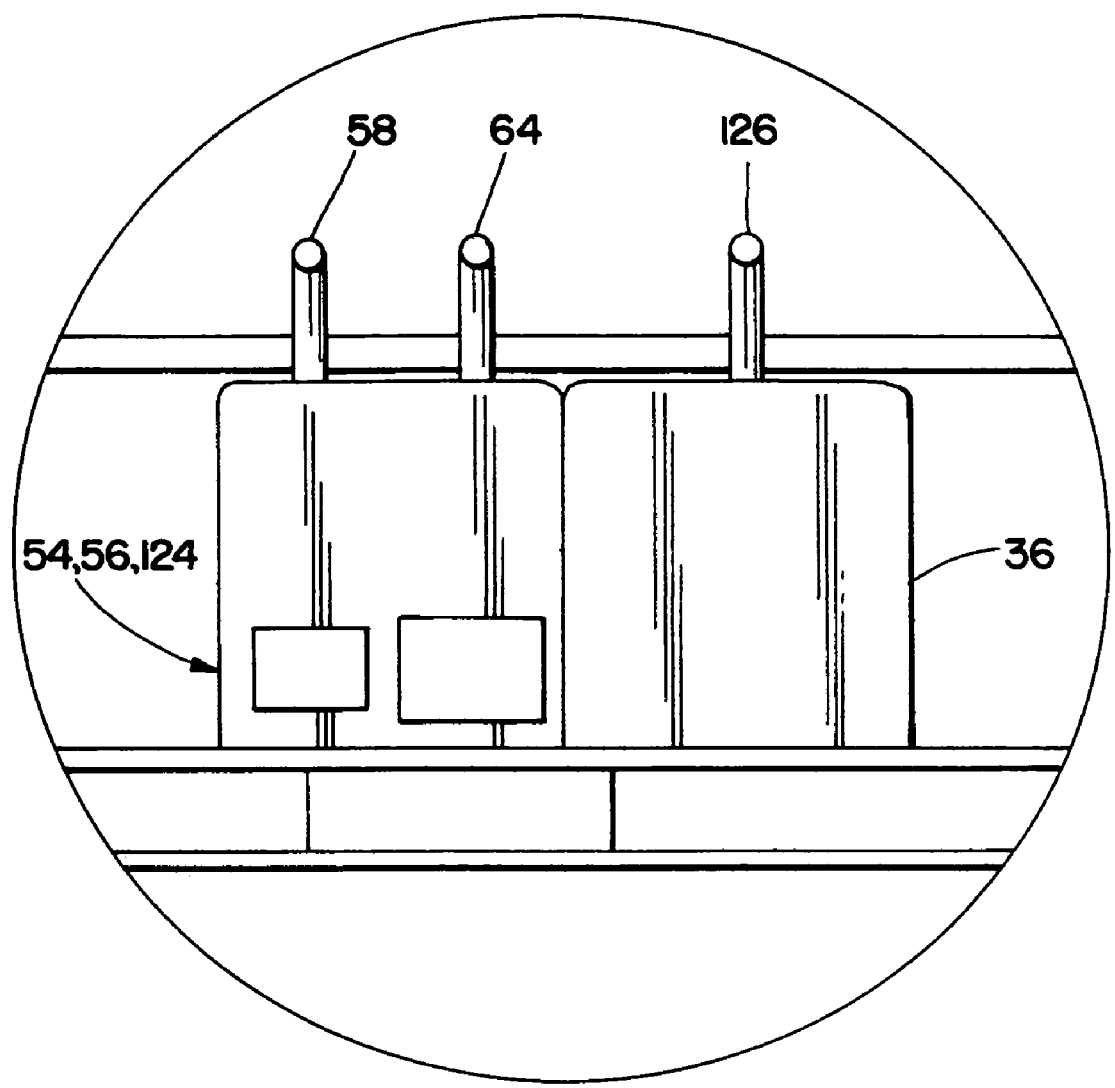
FIG. 8 shows a detail view of the controls mounted on the Port-o-Tower®.

In referring to FIG. 1, a tank or platform assembly (2) is shown slidably mounted onto a frame assembly (4). The tank or platform assembly (2) has a multiplicity consisting of at least four support legs (6) to provide maximum stability and support for the tank or platform assembly (2) when the tank or platform assembly (2) is in the raised position. The tank or platform assembly (2) may have a multiplicity of two or three support legs (6) but the tank or platform assembly (2) will have seriously diminished safety and stability in the raised position with a multiplicity of less than four support legs (6). The support legs (6) have top ends (8) and bottom ends (10). The top ends (8) of the support legs (6) are connected to the tank or platform assembly (2) and the bottom ends (10) of the support legs (6) are connected to the frame assembly (4).

The frame assembly (4) is generally rectangular in shape and comprises a front cross member (12) having a first end (9) and a second end (11) and a rear cross member (14) having a first end (17) and a second end (19), the front cross member (12) and the rear cross member (14) are connected to a first side support rail (13) and a second side support rail (15) by their respective first and second ends (9,11,17,19). The front cross member (12) has a midpoint (16) and the rear cross member (14) has a midpoint (18). A first hydraulic cylinder (20) is positioned at the midpoint (16) of the front cross member (12) and a second hydraulic cylinder (22) is positioned at the midpoint (18) of the rear cross member (14).

The first hydraulic cylinder (20) has a top (23) and a bottom (24), and the second hydraulic cylinder (22) has a top (25) and a bottom (26). The bottom (24) of the first hydraulic cylinder (20) is attached to the frame assembly (4) at the midpoint (16) of the front cross member (12) and the bottom (26) of the second hydraulic cylinder (22) is attached to the frame assembly (4) at the midpoint (18) of the rear cross member (14) while the top (23) of the first hydraulic cylinder (20) and the top (25) of the second hydraulic cylinder (22) are attached to the tank or platform assembly (2) and provide the force to extend and lower the tank or platform assembly (2).

A hydraulic system (28) consists of at least two hydraulic circuits. The hydraulic system (28) consists of a hydraulic reservoir (30), a hydraulic engine or pump assembly (32), a first control valve (34) and a second control valve (36) is mounted on the frame assembly (4). The hydraulic system (28) has a first hose (40) connecting the pump assembly (32) to a first fitting (42) in a bottom (44) of the hydraulic reservoir (30). A second fitting (46) in a top (48) of the hydraulic reservoir (30) is connected to a second hose (50). The second hose (50) is further connected to a third fitting (52) on the first control valve (34).

The first control valve (34) has a first control chamber (54), a second control chamber (56) and a third hydraulic control chamber (124). The first control chamber (54) has a first control lever (58) and first series of hydraulic pressure hoses and fittings (60) connecting the first control chamber (54) to the first hydraulic cylinder (20). A second series of hydraulic pressure hoses and fittings (62) act as a return line from the first hydraulic cylinder (20) to the first control chamber (54) for hydraulic fluid.

The second control chamber (56) has a second control lever (64) and a third series of hydraulic pressure hoses and fittings connecting the second control chamber (66) to the second hydraulic cylinder (22). A fourth series of hydraulic pressure hoses and fittings (67) acts as a return line from the second hydraulic cylinder (22) to the second control chamber (56) for returning hydraulic fluid to the second control chamber (56).

When the hydraulic pump assembly (32) is operating, hydraulic pressure is built up in the hydraulic system (28). When the first control lever (58) is moved to the open position, hydraulic pressure builds in the first hydraulic cylinder (20). The top end (23) of the first hydraulic cylinder (20) consists of a first shaft (38), where the first shaft (38) is extended by the hydraulic pressure from the first hydraulic cylinder (20), thereby elevating a front end (70) of the tank or platform assembly (2).

Alternatively, when the second control lever (64) is moved to the open position, hydraulic pressure builds in the second hydraulic cylinder (22). The top end (25) of the second hydraulic cylinder (22) consists of a second shaft (72), where the second shaft (72) is extended by the hydraulic pressure from the second hydraulic cylinder (22), thereby elevating a rear end (74) of the tank or platform assembly (2).

By slowly and carefully alternating the hydraulic pressure sent to the first and second hydraulic cylinders (20, 22) by means of the first and second control levers (58, 64), an empty tank or platform assembly (2) can be elevated to a desired position, where it can be filled with water, gasoline or other liquid. If the hydraulic reservoir (30) contains enough hydraulic fluid, and the hydraulic pump assembly (32) has adequate capability, the first and second hydraulic cylinders (20, 22) may be operated together, reducing the effective time the operator needs to raise and lower the tank or platform assembly (2).

Each of the multiplicity of support legs (6) has an outer cylinder (76) and an inner cylinder (78) where the inner cylinder (78) is free to slide within the outer cylinder (76). In this embodiment, the outer cylinder (76) is attached to the frame assembly (4) and the inner cylinder (78) is attached to the tank or platform assembly (2). When the first and second hydraulic cylinders (20,22) are elevating the tank or platform assembly (2), the outer cylinder (76) provides support and stability for the inner cylinder (78).

The tank or platform assembly (2) has two locking positions. When fully elevated, the tank or platform assembly (2) will be secured in the elevated position by the following means:

the inner cylinder (78) has a first through slot (80) defined therein, where the first through slot (80) is perpendicular to the inner cylinder's (78) longitudinal axis. The outer cylinder (76) has a second through slot (82) defined therein where the second through slot (82) is perpendicular to the longitudinal axis of the outer cylinder (76). In the fully elevated position, the first through slot (80) and the second through slot (82) are aligned, allowing a locking wedge (85) to be inserted there through.

An Auto Lock™ assembly (83), also known as an automatic support locking device assembly, comprises an Auto Lock™ housing assembly (84), (hereinafter called housing assembly (84) and an Auto Lock™ actuator assembly (hereinafter called actuator assembly (86)). The Auto Lock™ housing assembly (hereinafter called housing assembly (84) consists of a hollow housing (88), an attach plate (90) that is connected to the hollow housing (88) at one end and the actuator assembly (86) at the other end.

The actuator assembly (86) consists of an actuator housing (92), a first end cap (94), the first end cap (94) being attached to the actuator housing (92). The first end cap (94) has a spring stabilizer (96) attached thereon, the spring stabilizer (96) protrudes inside the actuator housing (92). Also, in the actuator housing (92) is a biasing means or spring (98). A first end (99) of the spring (98) is biased against the first end cap (94) and a second end (101) of said spring (98) is biased against a first face (100) of a piston pad (102). The piston pad (102) is free to slide within the actuator housing (92).

A second end cap (104) is attached to the actuator housing (92) at the end opposing the first end cap (94). A shaft (106) is centrally attached to a second face (108) of the piston pad (102). The second end cap (104) has a hole (110) defined centrally therein. The shaft (106) is slidably inserted through the hole (110) in the second end cap (104). A hydraulic seal means (112) (commonly known in the industry) seals the shaft (106). The second face (108) of the piston pad (102) and the second end cap (104) define a hydraulic chamber (114) therebetween. A first end (115) of a hydraulic line (116) is attached to a fitting (117) on the actuator housing (92) and communicates with the hydraulic chamber (114). The piston pad (102) will have a sliding seal that is common within the industry to prevent hydraulic fluid from leaking and maintain hydraulic pressure therein.

The actuator assembly (86) is attached to the housing assembly (84) using attach bolts (118) common in the industry. An end (120) of the shaft (106) is attached to the locking wedge (85). An inner surface (122) of the hollow housing (88) is shaped to provide a slip fit to the locking wedge (85). The inner surface (122) of the hollow housing (88) is designed to provide sliding support to all sides of the locking wedge (85).

The Auto Lock™ assembly (83) is attached to the outer cylinder (76) by means of the attach plate (90) by standard connecting means, such as welding, brazing or bolting. The attach plate (90) has a slot (91) centered thereon, allowing the locking wedge (85) to pass through the first through slot (80) and the second through slot (82), thereby locking the tank or platform assembly (2) in position.

The third hydraulic control chamber (124) is connected to the hydraulic line (116) at an other end (125) of the hydraulic line (116). When a third control lever (126) is switched to the unlocked or energized position, hydraulic fluid enters the hydraulic chamber (114) and pressure builds up on the piston pad (102), which compresses the return spring (98). In turn, the locking wedge (85) is retracted from the first and second through slots (80,82). This retraction process of the locking wedge (85) can occur only after the first and second control levers (58,64) are opened and the tank or platform assembly (2) is temporarily supported by the hydraulic cylinders (20,22), thus relieving the weight of the tank or platform assembly (2) on the outer and inner cylinders (76,78) and allowing the locking wedge (85) to retract.

After the locking wedges (85) on each of the Auto Lock™ assemblies (83) are retracted, the first and second control levers (58,64) can be moved to the closed position (alternatively, if necessary) and the tank or platform assembly (2) can be lowered back onto the frame assembly (4), to allow the tank or platform assembly (2) to be transported to a new location.

When said third control lever (126) is switched to an non-energized or locked position, the spring (98) will then have the capability to overcome the remaining hydraulic pressure within the third hydraulic control chamber (124), extending the locking wedge (85) through the first and second through slots (80, 82) securing the tank or platform assembly (2).

What is claimed is:

1. An automatic support locking device for portable towers and tanks comprising:
   a. a tank or platform assembly, said tank or platform assembly being slidably mounted onto a frame assembly, said tank or platform assembly having a multiplicity of support legs, said support legs attaching said frame assembly and said tank or platform assembly;
   b. a first hydraulic cylinder and a second hydraulic cylinder, said first hydraulic cylinder being mounted to a front cross member, said second hydraulic cylinder being mounted to a rear cross member, said front cross member and said rear cross member being integral components of said frame assembly;
   c. said first hydraulic cylinder being centrally located on said front cross member and said second hydraulic cylinder being centrally located on said rear cross member, said first and said second hydraulic cylinders each having a top and a bottom, said bottom of said first and said second hydraulic cylinders being attached to said front and said rear cross members respectfully, said top of said first and said second hydraulic cylinders each being attached to said tank assemblies;
   d. a first control lever and a second control lever, said first control lever allowing hydraulic pressure to raise and lower said first hydraulic cylinder, said second control lever allowing hydraulic pressure to raise and lower said second hydraulic cylinder, thereby raising and lowering said tank or platform assembly;
   e. each of said multiplicity of support legs has an outer cylinder and an inner cylinder, said inner cylinder being free to slide within said outer cylinder, each of said inner cylinders being attached to said frame assembly and each of said outer cylinders being attached to said tank or platform assembly, each of said inner cylinders having a first through slot defined therein, said first through slot being perpendicular to a longitudinal axis of each of said inner cylinders, each of said outer cylinders having a second through slot defined therein, each said second through slot being perpendicular to a longitudinal axis of each of said outer cylinders said second through slots additionally being aligned with each respective first through slot when said tank or platform assembly is raised to said tank or platform assembly's desired position;
   f. an automatic support locking device assembly, said automatic support locking device assembly comprising a hydraulic actuation means and a locking means; and
   g. said automatic support locking device assembly being attached to each of said outer cylinders thereon.

2. The automatic support locking device for portable towers and tanks of claim one wherein said hydraulic actuation means consists of a third control lever, said third control lever providing an energized or unlocked position, and providing a non-energized or locked position.

3. The automatic support locking device for portable towers and tanks of claim one wherein said locking means having a locking wedge, said locking wedge being retracted when said hydraulic actuation means is energized, said locking wedge being extended by a biasing means when said hydraulic actuation means is not energized thereby, said locking wedge extending through said first and said second through slots of said inner and said outer cylinders, locking said inner and said outer cylinders in a raised position.

4. An automatic support locking device for portable towers and tanks comprising:
  a. an automatic support locking device assembly, said automatic support locking device assembly comprising an automatic support locking device housing assembly and an automatic support locking device actuator assembly, said automatic support locking device housing assembly having a hollow housing and an attach plate, said attach plate being attached to said hollow housing at one end and to said automatic support locking device actuator assembly at an other end, said automatic support locking device actuator assembly has an actuator housing and a first end cap, said first end cap being attached to said automatic support locking device actuator housing, said first end cap having a spring stabilizer attached thereon, said spring stabilizer protruding inside said automatic support locking device actuator housing, a return spring, said return spring being biased on a first end against said first end cap and on a second end against a first face of a piston pad, said piston pad being adapted to be slidably mounted within said actuator housing, a second end cap, said second end cap being attached to said actuator housing at an end opposing said first end cap, a shaft, said shaft being centrally attached to a second face of said piston pad, said second end cap having a hole centrally defined therein, said shaft being slidably inserted through said hole in said second end cap;
  b. a hydraulic seal, said hydraulic seal sealing said shaft from said automatic locking device housing assembly, said second face of said piston pad and said second end cap define a hydraulic chamber therebetween, a hydraulic line is attached to a fitting on said actuator housing and communicates with said hydraulic chamber, said piston pad additionally has a sliding seal to prevent hydraulic fluid from leaking from said hydraulic chamber and maintain hydraulic pressure thereby;
  c. said automatic locking device actuator assembly is attached to said automatic support locking device housing assembly by an attachment means, an end of said shaft is attached to a locking wedge, an inner surface of said hollow housing is shaped to provide a slip fit for said locking wedge, with said inner surface of said hollow housing providing support to all sides of said locking wedge allowing a non-binding slip fit;
  d. said automatic locking device assembly being attached to an outer cylinder of a tank or platform assembly, an inner cylinder, said inner cylinder being attached to a frame assembly, said outer cylinder having a second through slot defined therein, said inner cylinder having a first through slot defined therein, said outer cylinder and said inner cylinder being slidably mounted allowing said first and second through slots to be coincidently aligned allowing said locking wedge to be inserted therethrough;
  e. said inner cylinder and said outer cylinder defining a support leg, said tank or platform assembly and said frame assembly having a multiplicity of support legs; and
  f. a third control lever, said third control lever providing an actuating means to retract said locking wedge thereby, said third control lever additionally providing a means to allow said biasing means to extend said locking wedge thereby.

5. The automatic support locking device for portable towers and tanks of claim four wherein said means to retract said locking wedge is hydraulic pressure from a hydraulic system controlled by said third control lever.

6. The automatic support locking device for portable towers and tanks of claim four wherein said means to allow said biasing means to extend said locking wedge comprises said third control lever, said third control lever allowing hydraulic pressure to be reduced, allowing said biasing means to overcome said remaining hydraulic pressure.

7. The automatic support locking device for portable towers and tanks of claim four wherein said multiplicity of support legs is at least four.

8. The automatic support locking device for portable towers and tanks of claim four wherein said attachment means for said automatic locking device actuator assembly and said automatic support locking device housing assembly are attach bolts.

9. The automatic support locking device for portable towers and tanks of claim four wherein said biasing means is a spring.

10. An automatic support locking device for portable towers and tanks comprising:
  a. a tank or platform assembly, said tank or platform assembly mounted on a frame assembly, said tank or platform assembly having a multiplicity of support legs, said support legs connected on a bottom end of each support leg to said frame assembly, said support legs connected on a top end of each support leg to said tank or platform assembly, said frame assembly having a first side support rail, a second side support rail parallel to said first side support rail, a front cross member attached to said first side support rail at a first end of said front cross member and attached to said second side support rail at a second end of said front cross member, a rear cross member attached to said first side support rail at a first end of said rear cross member and attached to said second side support rail at a second end of said rear cross member;
  b. a first hydraulic cylinder, said first hydraulic cylinder located on a center point of said front cross member, said first hydraulic cylinder having a top and a bottom, said top of said first hydraulic cylinder attached to said tank or platform assembly and said bottom end of said first hydraulic cylinder attached to said center point of said front cross member, a second hydraulic cylinder, said second hydraulic cylinder located on a center point of said rear cross member said first hydraulic cylinder having a top and a bottom, said top of said second hydraulic cylinder attached to said tank or platform assembly and said bottom end of said second hydraulic cylinder attached to said center point of said rear cross member;
  c. a hydraulic system having a hydraulic pump connected to a hydraulic reservoir by a first hose to a first fitting in a bottom of said hydraulic reservoir, a second fitting on top of said hydraulic reservoir is connected to a second hose which is connected to a third fitting on a first control valve, said first control valve having a first control chamber with a first control lever, a second control chamber with a second control lever, a third control chamber with a third control lever, said first hydraulic control chamber having a first series of hydraulic pressure hoses and fittings connecting said first control chamber to said first hydraulic cylinder, a second series of hydraulic hoses and fittings act as a return line from said first hydraulic cylinder to said first control chamber for return of hydraulic fluid, said second control valve has a third series of hydraulic hoses and fittings connecting said second control chamber to said second hydraulic cylinder, said second control chamber has a fourth series of hydraulic hoses and fittings for returning hydraulic fluid to said second control chamber;

d. when said first control lever is moved to an open position, hydraulic fluid is pumped to said first hydraulic cylinder and said top end of said first hydraulic cylinder elevates a front end of said tank or platform assembly to a desired height, when said second control lever is moved to an open position, hydraulic fluid is pumped to said second hydraulic cylinder and said top end of said second hydraulic cylinder elevates a rear end of said tank or platform assembly to a desired height;

e. each of said multiplicity of support legs has an outer cylinder and an inner cylinder, said inner cylinder is free to slide within said outer cylinder, each of said inner cylinders is attached to said frame assembly and each of said outer cylinders is attached to said tank or platform assembly, each of said inner cylinders having a first through slot perpendicular to each of said inner cylinder's longitudinal axis, each of said outer cylinders having a second through slot perpendicular to a longitudinal axis of each of said outer cylinder and aligned with each respective first through slot of said inner cylinder when said tank or platform assembly is elevated to it's desired position;

f. an automatic support locking device assembly comprising an automatic support locking device housing assembly and an automatic support locking device actuator assembly, said automatic support locking device housing assembly has a hollow housing, an attach plate is attached to said hollow housing at one end and to said automatic support locking device actuator assembly at an other end, said automatic support locking device actuator assembly has an actuator housing, a first end cap, said first end cap being attached to said actuator housing, said first end cap having a spring stabilizer attached thereon, said spring stabilizer protrudes inside said actuator housing, a return spring, said return spring is biased on a first end against said first end cap and on a second end against a first face of a piston pad, said piston pad is free to slide within said actuator housing, a second end cap is attached to said actuator housing at an end opposing said first end cap, a shaft is centrally attached to a second face of said piston pad, said second end cap has a hole centrally defined therein, said shaft is slidably inserted through said hole in said second end cap;

g. a hydraulic seal means seals said shaft, said second face of said piston pad and said second end cap define a hydraulic chamber therebetween, a hydraulic line is attached to a fitting on said actuator housing and communicates with said hydraulic chamber, said piston pad has a sliding seal to prevent hydraulic fluid from leaking from said hydraulic chamber;

h. said Auto Lock™ actuator assembly is attached to said automatic support locking device housing assembly by an attachment means, wherein said attachment means are attach bolts, an end of said shaft is attached to a locking wedge, an inner surface of said hollow housing is shaped to provide a slip fit for said locking wedge, with said inner surface of said hollow housing providing support to all sides of said locking wedge;

i. said Auto Lock™ assembly is attached to each respective outer cylinder by means of said attach plate, using connecting means common in the industry, said attach plate has a slot centered thereon, allowing said locking wedge to pass therethrough and through said first through slot in said outer cylinder and through said second through slot in said inner cylinder, thereby locking said tank or platform assembly into position when said tank or platform assembly reaches it's desired elevation; and j. said first control lever and said second control lever can be moved to the open position to temporarily support said tank or platform assembly, said third control chamber is connected to said hydraulic line at an other end of said hydraulic line, so that when said third control lever is turned to the open position, hydraulic fluid enters each said hydraulic chamber and pressure builds up on each said piston pad, which in turn compresses each said return spring and retracts each said locking wedge from said first through slot and said second through slot, allowing said first control lever and said second control lever to be then moved to the respective closed position and permitting said tank or platform assembly to be lowered onto said frame assembly for transport to a new location.

* * * * *